(12) United States Patent
Souche et al.

(10) Patent No.: US 10,237,585 B2
(45) Date of Patent: Mar. 19, 2019

(54) DYNAMIC CONTENT RENDERING IN MEDIA

(71) Applicant: ACCENTURE GLOBAL SOLUTIONS LIMITED, Dublin (IE)

(72) Inventors: Christian Souche, Cannes (FR); Edouard Mathon, Antibes (FR); Alexandre Naressi, Valbonne (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/934,697

(22) Filed: Mar. 23, 2018

(65) Prior Publication Data

US 2018/0310039 A1 Oct. 25, 2018

(30) Foreign Application Priority Data

Apr. 25, 2017 (EP) .................................. 17168066

(51) Int. Cl.

| | |
|---|---|
| *H04N 21/234* | (2011.01) |
| *G06Q 30/02* | (2012.01) |
| *G06T 15/20* | (2011.01) |
| *G06T 7/13* | (2017.01) |
| *G06T 7/73* | (2017.01) |

(Continued)

(52) U.S. Cl.
CPC ....... *H04N 21/23424* (2013.01); *G06Q 30/02* (2013.01); *G06Q 30/0277* (2013.01); *G06T 7/10* (2017.01); *G06T 7/13* (2017.01); *G06T 7/75* (2017.01); *G06T 15/205* (2013.01); *G06T 19/20* (2013.01); *H04N 21/23412* (2013.01); *H04N 21/23418* (2013.01); *H04N 21/25825* (2013.01); *H04N 21/2668* (2013.01);
(Continued)

(58) Field of Classification Search
CPC ....... H04N 21/23424; G06T 7/75; G06T 7/13; G06T 15/205; G06Q 30/0277
See application file for complete search history.

(56) References Cited

U.S. PATENT DOCUMENTS

| | | |
|---|---|---|
| 7,908,172 B2 | 3/2011 | Corts et al. |
| 9,424,494 B1 | 8/2016 | Lineback et al. |

(Continued)

FOREIGN PATENT DOCUMENTS

| | | |
|---|---|---|
| WO | 2015/047246 | 4/2015 |

OTHER PUBLICATIONS

Fanman et al., "From Logo to Object Segmentation", IEEE Transactions on Multimedia, vol. 15, No. 8, pp. 2186-2197.

(Continued)

*Primary Examiner* — Hai V Tran
*Assistant Examiner* — Susan X Li
(74) *Attorney, Agent, or Firm* — Mannava & Kang, P.C.

(57) ABSTRACT

A system for rendering media having content displayed comprises a receiving unit to receive media, a scanner to detect an object in the media for placing a placeholder, a checker to provide the placeholder to a user for feedback and receive the feedback. The system also includes a template generator to generate a template indicating the placeholder in the media. The system also includes a rendering unit in communication with the template generator to render, upon receiving a request for watching the media, the media having content to display to the user, based on at least one of a storage space and a processing capacity.

18 Claims, 7 Drawing Sheets

(51) Int. Cl.
  *G06T 19/20* (2011.01)
  *H04N 21/258* (2011.01)
  *H04N 21/2668* (2011.01)
  *H04N 21/44* (2011.01)
  *H04N 21/472* (2011.01)
  *H04N 21/81* (2011.01)
  *G06T 7/10* (2017.01)

(52) U.S. Cl.
  CPC . *H04N 21/44008* (2013.01); *H04N 21/47205* (2013.01); *H04N 21/812* (2013.01); *H04N 21/8146* (2013.01)

(56) References Cited

U.S. PATENT DOCUMENTS

| | | |
|---|---|---|
| 2002/0078446 A1 | 6/2002 | Dakss et al. |
| 2008/0046499 A1 | 2/2008 | Cabrera et al. |
| 2008/0184288 A1 | 7/2008 | Lipscomb |
| 2008/0249986 A1 | 10/2008 | Clarke-Martin |
| 2009/0019487 A1 | 1/2009 | Kulas |
| 2009/0092374 A1 | 4/2009 | Kulas |
| 2010/0064025 A1 | 3/2010 | Nelimarkka et al. |
| 2010/0154007 A1 | 6/2010 | Touboul et al. |
| 2011/0177775 A1 | 7/2011 | Gupta et al. |
| 2012/0253937 A1 | 10/2012 | Wing et al. |
| 2014/0140680 A1 | 5/2014 | Jo |
| 2014/0259056 A1* | 9/2014 | Grusd ............... H04N 21/8583 725/34 |
| 2014/0282724 A1* | 9/2014 | Chalozin ............ G06T 19/006 725/35 |
| 2015/0264416 A1* | 9/2015 | Heinz, II ........... H04N 21/2668 725/34 |
| 2015/0363635 A1 | 12/2015 | Suri et al. |
| 2016/0034786 A1 | 2/2016 | Suri et al. |
| 2016/0212455 A1* | 7/2016 | Manna ................ G06Q 30/02 |

OTHER PUBLICATIONS

Kang Kai et al., "Object Detection from Video Tubelets with Convolutional Neural Networks", 2016 IEEE Conference on Computer Vision and Pattern Recognition (CVPR), IEEE, Jun. 27, 2016, pp. 817-825.

Wenguan Wang et al., "A Unified Spatiotemporal Prior based on Geodesic Distance for Video Object Segmentation", IEEE Transactions on Pattern Analysis and Machine Intelligence, Jan. 31, 2017, pp. 1-18.

Kruthiventi Srinivas SS et al., "Saliency Unified: A Deep Architecture for simultaneous Eye Fixation Prefiction and Salient Object Segmentation", 2016 IEEE Conference on Computer Vision and Pattern Recognition (CVPR), IEEE, Jun. 27, 2016, pp. 5781-5790.

Extended European Search Report dated Jun. 22, 2017 for EP application No. 17168066.3-1908.

Alan J. Lipton, et al., "Moving Target Classification and Tracking from Real-time Video", Oct. 19, 1998, fourth IEEE Workshop on Princeton, NJ, 8 pages.

* cited by examiner

DYNAMIC CONTENT RENDERING IN MEDIA

PRIORITY AND CROSS-REFERENCE TO RELATED APPLICATIONS

This application claims priority to European Patent Application Number 17168066.3 filed on Apr. 25, 2017, the disclosure of which is incorporated by reference and is related to another European Patent Application titled "Dynamic Content Placement In Media" bearing Application Number 17168069.7 and filed on Apr. 25, 2017, the disclosure of which is incorporated by reference.

BACKGROUND

In order to stay ahead of their competition, organizations are using various marketing strategies to reach out to customers. One such technique is to advertise products and services while streaming media to viewers. Such media may include, but is not limited to, videos and images. For advertising products, corresponding content such as company logos are placed in the media.

Once the content is placed in the media, the media is rendered to the viewers. As is generally known, rendering is a process of integrating the original media with the content. The rendering of the media to the viewers is dependent on factors such as, for example, an available storage space and a processing capacity of the rendering system. Control over the remote player playing the media is another factor. One of the techniques for rendering the media is known as a pre-rendering technique. In the pre-rendering technique, content is integrated with the media, and then the media is pre-rendered before a request for rendering is actually received from the viewers. In such a technique, the pre-rendered media is rendered based on the receipt of the request from the viewer. While such a rendering technique would require less processing capacity, it would need a large storage space.

Another rendering technique is the on-demand rendering technique. In this technique, the media is integrated with the content and then rendered to the viewers, when a request is received from the viewer. Thus, the rendering is done real-time. The on-demand rendering technique demands less storage space and higher processing capacity to be able to stream the media to the viewer without compromising with the visual experience. This differs from the pre-rendering technique discussed above which requires large storage space but less processing capacity. Thus, the available rendering technique may either be storage intensive or may require substantial processing capabilities to provide the desired user experience.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
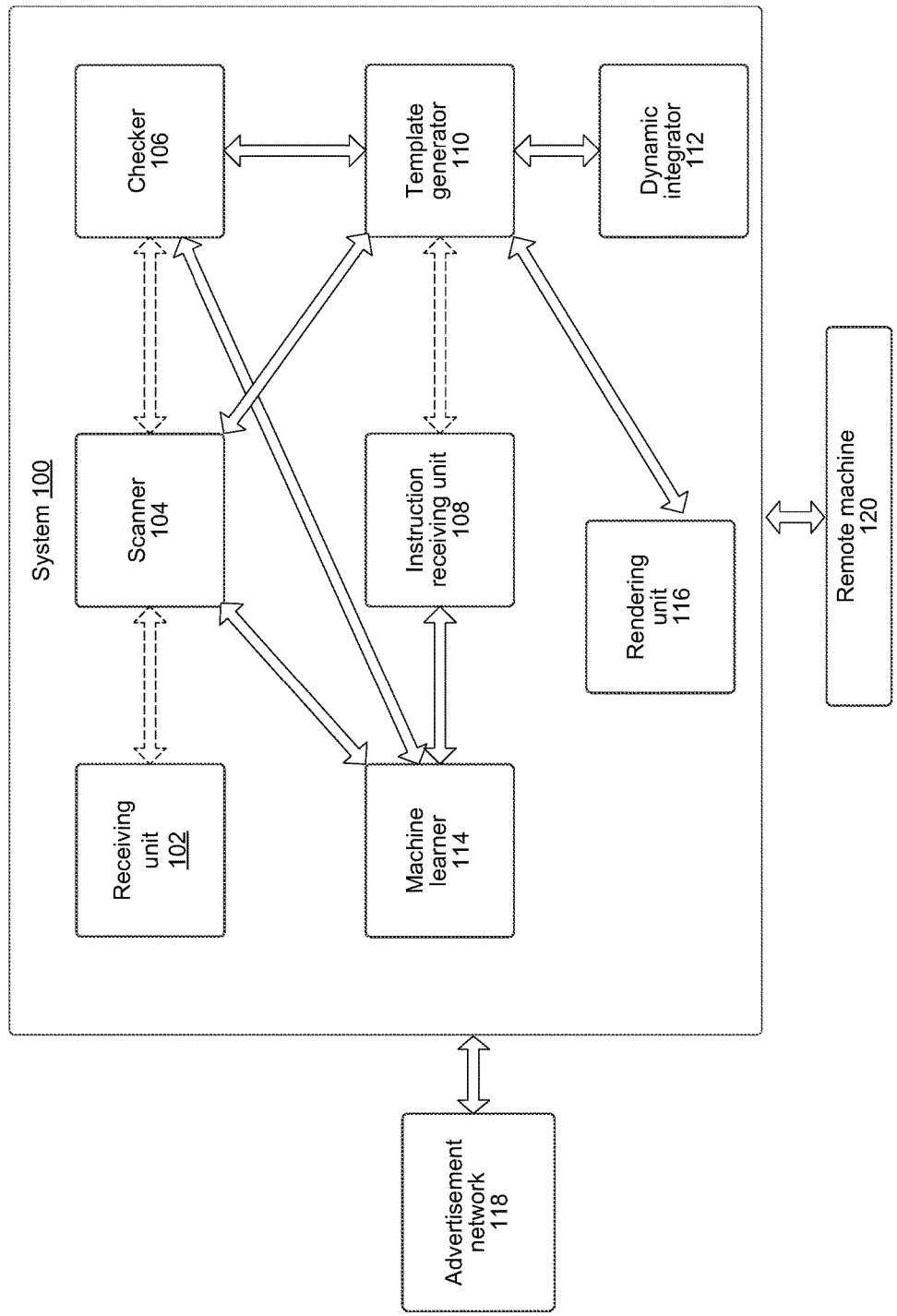
FIG. 1 illustrates a block diagram of a system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and methods for placement of content in media, and more particularly, video, and rendering the media to viewers. According to an example of the present disclosure, the system may include a receiving unit, a scanner, a checker, an instruction receiving unit, a template generator, a machine learner, and a rendering unit. In an example embodiment, the receiving unit, the scanner, the checker, the instruction receiving unit, the template generator, the machine learner, and the rendering unit may be in communication with each other to perform the functionalities of the system. The receiving unit may receive the content, which may include, but is not limited to, a still image and a video.

Upon receiving the content, the scanner may detect a potential object in the media for placing a placeholder. In an example embodiment, the object may be detected, based on a semantic segmentation technique and an edge detection technique. Further, the scanner may determine a position of the placeholder to be placed in the object of the content. Based on the determination, the checker may provide the placeholder being positioned in the content to a user for feedback. In response, the checker may receive the feedback from the user for the placeholder. The feedback may be indicative of one of an approval, a rejection, and a pending status of the placeholder.

In an example embodiment where the placeholder is approved by the user, the instruction receiving unit may receive instructions from the user for adding special effects to the placeholder. The special effects may include, but are not limited to, one of a color adjustment, a contrast adjustment, a brightness adjustment, a saturation adjustment, and a blur adjustment.

Further, the template generator may generate a template indicating the placeholder in the media. The template may include at least one of details pertaining to the media, details pertaining to the approved placeholder, and details pertaining to the special effects of the approved placeholder. In an example embodiment, following the generation of the template, the system may select an advertisement to be positioned in the selected placeholder.

The machine learner may store the feedback of the user for the placeholder and selection of the special effects for the placeholder as received by the checker and the instruction receiving unit, respectively. The details stored by the machine learner may be used for future placements of the placeholders in the media.

In an example embodiment, the scanner may detect another object in the media or in another media, based on the feedback stored by the machine learner.

Further, the scanner may determine a position of another placeholder to be associated with the other object, based on the stored feedback. The feedback may be used to determine the user's preference of object selection in the media for placing the placeholder and the user's preference of selection of the positioning of the placeholders in the media. The scanner may use the stored selection of the special effects to suggest the special effects for addition to the other placeholder. Once the content are placed in the media, the rendering unit may render the media along with the content to the viewers.

The system of the present disclosure offers a time-effective integration of the content into media. The time taken by the system to perform the content placement may be less than the time taken by completely manual techniques. Further, the quality of the placeholders or content in the content may be better than the accuracy offered by a fully automated approach. In addition, the quality of content placed in the media continuously improves, based on the details stored by the machine learner. Therefore, the present subject matter provides a comprehensive, economic, and time-effective positioning of content in media.

FIG. 1 illustrates a schematic view of a system 100 for placement of information, such as content in media and rendering the media to viewers, according to an example of the present disclosure. The present description has been explained in considerable detail with respect to placement of advertisements in streaming video; however it will be appreciated that other information in the form of images and videos may also be suitably placed in media. In an example embodiment, the content may include one of a still image and a video. The system 100 may include a receiving unit 102, a scanner 104, a checker 106, an instruction receiving unit 108, a template generator 110, a dynamic integrator 112, a machine learner 114, and a rendering unit 116. The system 100 may interface with an advertisement network 118 and a remote machine 120.

In an example embodiment, the scanner 104 may be in communication with the receiving unit 102. The checker 106 may be in communication with the scanner 104. The instruction receiving unit 108 may be in communication with the scanner 104. The template generator 110 may be in communication with the scanner 104, the checker 106, and the instruction receiving unit 108. The dynamic integrator 112 may be in communication with the template generator 110. The machine learner 114 may be in communication with the scanner 104, the checker 106, and the instruction receiving unit 108. The rendering unit 116 may be in communication with template generator 110.

In an embodiment, the receiving unit 102 may receive the media. The media may be received from a data repository (not shown), which may be an internal data repository or an external data repository. In an example embodiment, the receiving unit 102 may receive the media from media owners. In an example embodiment, the media owners may upload the media on a front end interface (not shown) of the system 102 or through an access to Application Program Interface (API) of the system 102. Further, the system 102 may store the media on a server or a cloud storage unit.

Figure 2:
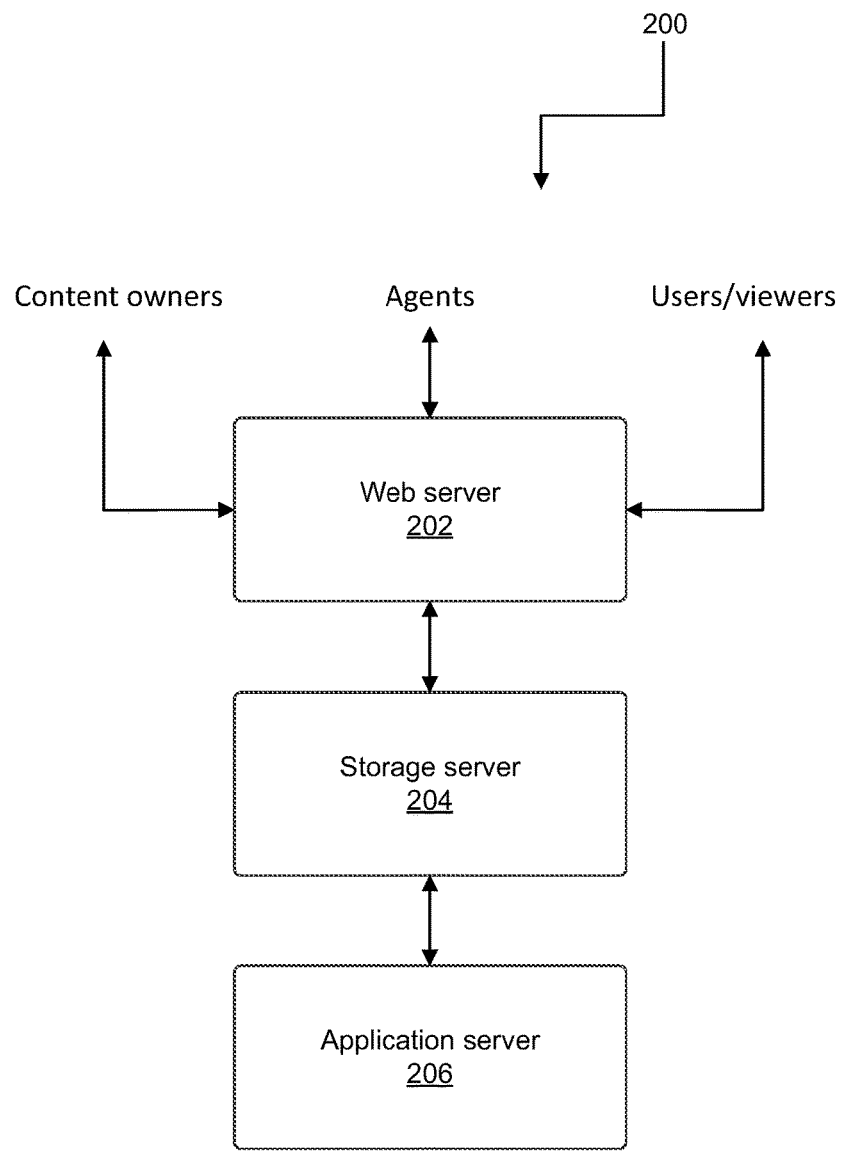
FIG. 2 illustrates receipt and storage of a content by the system, according to an example embodiment of the present disclosure.

FIG. 2 illustrates the receipt and storage of the media by the system 100, according to an example embodiment of the present disclosure. As shown, the media owners, the viewers of the media, and agents may interact with a web server 202 of the system 100. The web server 202 may be in communication with a storage server 204, also referred to as a cloud storage 204. The storage server 204 may further be in communication with an application server 206 of the system 100.

Referring back to FIG. 1, the scanner 104 may detect a potential object in the media for placing a placeholder. The object may be indicative of any object depicted in the media such as, a wall, a car door, or a banner. Further, the placeholder may be rendered as a graphical box formed on the object indicative of a location for accommodating content in the media.

In an example embodiment, the scanner 104 may detect the object by using artificial intelligence techniques. The scanner 104 may analyze the media and may detect the object in the media where placeholder can be positioned.

In order to detect the object in the media, the scanner 104 may initially detect a shape of the object. In an example embodiment, the scanner 104 may detect the shape of the object by a semantic segmentation technique. In the semantic segmentation technique, the scanner 104 may assign a predefined label to each pixel of the media. Subsequently, the scanner 104 may highlight a two-dimensional outline of the object so formed by the assignment. The scanner 104 may outline a scene of the media, and may also detect the shape of the object in background or foreground of the media, which may be used for content display.

After detecting the shape, the scanner 104 may detect edges of the object in the media. In an example embodiment, the edges may be detected by an edge detection technique. The edge detection technique may include, but is not limited to, a phase stretch transform technique and a canny technique. The detection of the edges may assist in detecting flat areas on the object in the media. Furthermore, the scanner 104 may recognize a three-dimensional orientation of the object. The three-dimensional orientation of the object assists in adapting a layout of content that can be placed in the media.

In an example embodiment, the scanner 104 may output a set of two-dimensional and three-dimensional coordinates indicative of a height, a width, and a position of the object in the media. Therefore, such coordinates may be used by the system 100 for detecting the object in the media.

Once the object is detected by the scanner 104, the scanner 104 may determine a position of the placeholder to be placed on the object of the media. In an example embodiment, in order to determine the position of the placeholder, the scanner 104 may detect one or more rectangles in the media for positioning the placeholder. Specifically, the scanner 104 may detect a rectangle that can be contained inside the object, and which is not crossing any edges as detected by the scanner 104 in the previous step. When the scanner 104 may detect multiple rectangles in the same area of the media, the scanner 104 may select the rectangle with bigger dimensions and no intersecting edges in the media.

In an example embodiment, when the media is a video, the system 100 may treat the video as a sequence of frames. In particular, the scanner 104 may detect the placeholder in different frames of the video. Based on the detection and order of the frames, the scanner 104 may track the placeholder in the video. The placeholder in the different frames may be tracked, based on a comparison of coordinates of the placeholder in the different frames. In one example, the scanner 104 may determine whether a placeholder detected in the different frames of the video stay long enough in the video to accommodate the advertisement effectively.

For example, a placeholder that is detected in 100 frames of the video may be prioritized for selection in comparison to a placeholder that is detected in 25 frames of the video.

In an example embodiment, the scanner 104 may detect rectangles in a frame $f_n$, a frame $f_{n-1}$, and a frame $f_{n+1}$. The scanner 104 may compare rectangles of the frame $f_n$ and the frame $f_{n-1}$ and rectangles of the frame $f_n$ and the frame $f_{n+1}$. The rectangles may be a part of the same segment having corners with similar positions between 2 frames that are affected to the same placeholder and, therefore, the scanner 104 may determine the position to be moving.

The similarity may be based on x and y coordinates of the corners, and the difference of the positions between two frames to be affected to the same placeholder should be less than z percent of a height for x and a width for y. The value of z may depend on the type of media. For example, a media with fast camera movements and many action scenes may have a z value higher than, for example, a talk show. Such observation may allow the tracking of a rectangle on scenes moving more or less quickly.

In one example, the detected zone may get hidden during a scene of the video. Therefore, the scanner 104 may compare the rectangles which are part of the same segment between the frame $f_n$ and a frame $f_{n+x}$. If a segment different than the one where the rectangle is placed is on the rectangle position between the frame $f_{n+1}$ and a frame $f_{n+x-1}$ then the scanner 104 may determine that the segment is covering the rectangle position.

In an example embodiment, the scanner 104 may track the movement of the placeholder in the media in order to ensure a smooth and consistent animation of the advertisement to be positioned in the placeholder in the object.

Following the positioning of the placeholder in the media, in an example embodiment, the checker 106 may provide the placeholder being positioned in the media to a user for feedback. In one example, the user may be an administrator of the system 100. In another example, the user may be a person who is skilled in the art of media editing or marketing or graphic designing, also referred to as an agent.

In an example embodiment, the checker 106 may highlight at least one zone by the placeholder for placing content in a frame of the media. In one example, the at least one zone may be highlighted in form of a semi-transparent rectangle. In an alternate example embodiment, the checker 106 may provide the placeholder to the user by inserting the advertisement in at least one zone of a frame of the media. In case of the media being a video, the checker 106 may allow the user to track the position of the placeholder in different frames of the video over time.

The user may provide the feedback for the placeholder to the system 100. The checker 106 may receive the feedback of the user. The feedback may be indicative of one of an approval, a rejection, and a pending status of the placeholder. The pending status of the placeholder may be indicative of the user wanting more time to approve or reject the placeholder to be positioned in the media. In one example, the user may be able to provide the feedback by clicking on the placeholder. In case of the media being a video, the feedback of the user for the placeholder on a frame is replicated for the placeholder detected in other frames of the video.

In an example embodiment, when the user may provide the feedback for the placeholder as "approved", the instruction receiving unit 108 may receive instructions from the user for adding special effects to the placeholder. The special effects may include, but are not limited to, one of a color adjustment, a contrast adjustment, a brightness adjustment, a saturation adjustment, and a blur adjustment.

Upon receiving the instructions, the instruction receiving unit 108 may replace the placeholder with a neutral image on the media. The neutral image may be indicative of the content without the special effects. Further, the instruction receiving unit 108 may change an appearance of the neutral image, based on selection of one of more of the special effects.

In an example embodiment, the template generator 110 may generate a template indicating the placeholder in the media. The template may include, but is not limited to, details pertaining to the media, details pertaining to the approved placeholder, and details pertaining to the special effects of the approved placeholder. Furthermore, the details pertaining to the media may include, but are not limited to, a name, a description, a location of the media on a storage server, and metadata. In addition, the details pertaining to the placeholder may include, but are not limited to, a position of the placeholder, dimensions of the placeholder, and a frame of the placeholder.

Once the template is generated by the template generator 110, the receiving unit 102 may receive the content to be inserted in the placeholder of the media. In an example embodiment, the content may be an advertisement received from an advertisement network 118, for example, by using targeting advertisement techniques. The advertisement may be, e.g., a logo of an advertiser. In another example embodiment, the receiving unit 102 may receive the content, when a user may upload the content to the system 100.

Furthermore, the dynamic integrator 112 may insert the content in the placeholder of the media as indicated in the template. The advertisement may be inserted in the placeholder, based on dimensions of the advertisement and dimensions of the placeholder. In an example embodiment, the dimensions of the advertisement may correspond to the dimensions of the placeholder.

While some example embodiments contemplate the scanner 104 providing placeholders for inserting content in the media as discussed above, in alternative embodiments such placeholders may be input from a system external (not shown) to system 100. Furthermore, in alternative embodiments the placeholders may be prioritized based on visual interest data indicative of certain placeholders being more likely to hold the viewers' attention over the others. Specifically, placeholders with a higher likelihood of holding the viewers' attention may be ranked higher than other placeholders. Such ranking of the placeholders may allow a user to make a more informed decision in choosing the appropriate placeholder to place content in the media. Additionally, the placeholder priority information may also be fed into the machine learner 114 so as to further refine the selection of placeholders when there is another need to place content in a media.

In an example embodiment, the ranking may be depicted via a number inserted in each placeholder by the external system. In another example embodiment, the higher ranked placeholders may be tagged with one color as opposed to lower ranked placeholders tagged with a different color. In yet another example embodiment, the order of priority amongst the placeholders may be conveyed to system 100 via a visual heat map generated by an external system (not shown) based on visual interest data.

When the media is a video, in continuation with the placement of the media in the media, the media has to be rendered to viewers. In the present example embodiment, the rendering unit 116 may render the media to the viewers. The rendering unit 116 may detect frames of the video having the placeholder. The rendering unit 116 may detect the frames having the placeholder, based on the details of the media and the approved placeholder indicated in the template.

Based on the detection, the rendering unit 116 may classify the frames into frames with placeholders and frames without placeholders.

In an example embodiment, upon receiving a request for watching the media by a viewer, the rendering unit 116 may render the media having the advertisement to the viewer. The media may be rendered based on at least one of a storage space and a processing capacity. In an example embodiment, a remote player for playing the media may allow the media to be played in portions. In such an example embodiment, initially, the rendering unit 116 may provide portions of the media having the frames without the placeholders to the viewer. Further, the rendering unit 116 may render portions of the media having the frames with the placeholders while the portions of the media having the frames without the placeholders are being simultaneously watched by the viewer.

In an example embodiment, the remote player may allow the media to be played in one piece. In such an example embodiment, the rendering unit 116 may render portions of the media having the frames with the placeholders. Further, the rendering unit 116 may provide the media having the frames without the placeholders and the frames with the placeholders to the user, when the rendering is finished.

In an example embodiment, when the rendering is not finished by the time the remote player reaches the portion, the rendering unit 116 may abort the rendering of a portion of the media having the frames with the placeholders. Further, the rendering unit 116 may provide the portion of the media without the placeholders, after the abortion.

In an alternative example embodiment, the rendering unit 116 may detect a position of the placeholder in the media. The position of the placeholder may be detected based on the details pertaining to the placeholder indicated in the template. Based on the detection of the placeholder, the rendering unit 116 may cut portions of the media having the placeholder, from the media. After cutting the portion from the media, the rendering unit 116 may crop the portions having the placeholder. Upon receiving a request for watching the media, the rendering unit 116 may render the cropped portions of the media having the placeholder to the viewer.

In an example embodiment when the remote player allows, the rendering unit 116 may provide portions of the media without the placeholder. Further, the rendering unit 116 may render the cropped portions of the media having the placeholder while the portions of the media without the placeholders are being simultaneously watched. The rendering unit 116 may render the cropped portions based on the details pertaining to the placeholder indicated in the template.

In an example embodiment when the remote player allows the media to be played in one piece, the rendering unit 116 may render portions of the media with the placeholders. Subsequently, the rendering unit 116 may provide the media having the portions without the placeholder and the portions with the placeholder, when the rendering is finished.

In yet another example embodiment, the rendering unit 116 may receive information pertaining to specification of a remote machine 120 being used to watch the media. Based on the specification of the remote machine, the rendering unit 116 may determine whether the remote machine 120 is compatible to render the media. Further, the media, the advertisement, and the template may be provided to the remote machine 120. The rendering unit 116 may integrate the advertisement with each frame of the media, based on the template, while portions of the media without the placeholder are already being played by the remote machine 120. Following the rendering of the media along with the advertisement, the media may be streamed to the viewer.

In an example embodiment, the machine learner 114 may store the feedback of the user for the placeholder and the selection of the special effects for the placeholder as received by the checker 106 and the instruction receiving unit 108, respectively. Further, the machine learner 114 may forward the stored feedback and the selection of the special effects to the scanner 104.

The scanner 104 may use the details stored by the machine learner 114 for subsequent placements of the placeholders in the media or another media. The scanner 104 may detect another object in the media or the other media, based on the stored feedback. Further, the scanner 104 may determine a position of another placeholder to be placed in the other object, based on the stored feedback. Subsequently, the scanner 104 may suggest special effects for addition to the other placeholder, based on the stored selection of the special effects by the machine learner 114.

Figure 3:
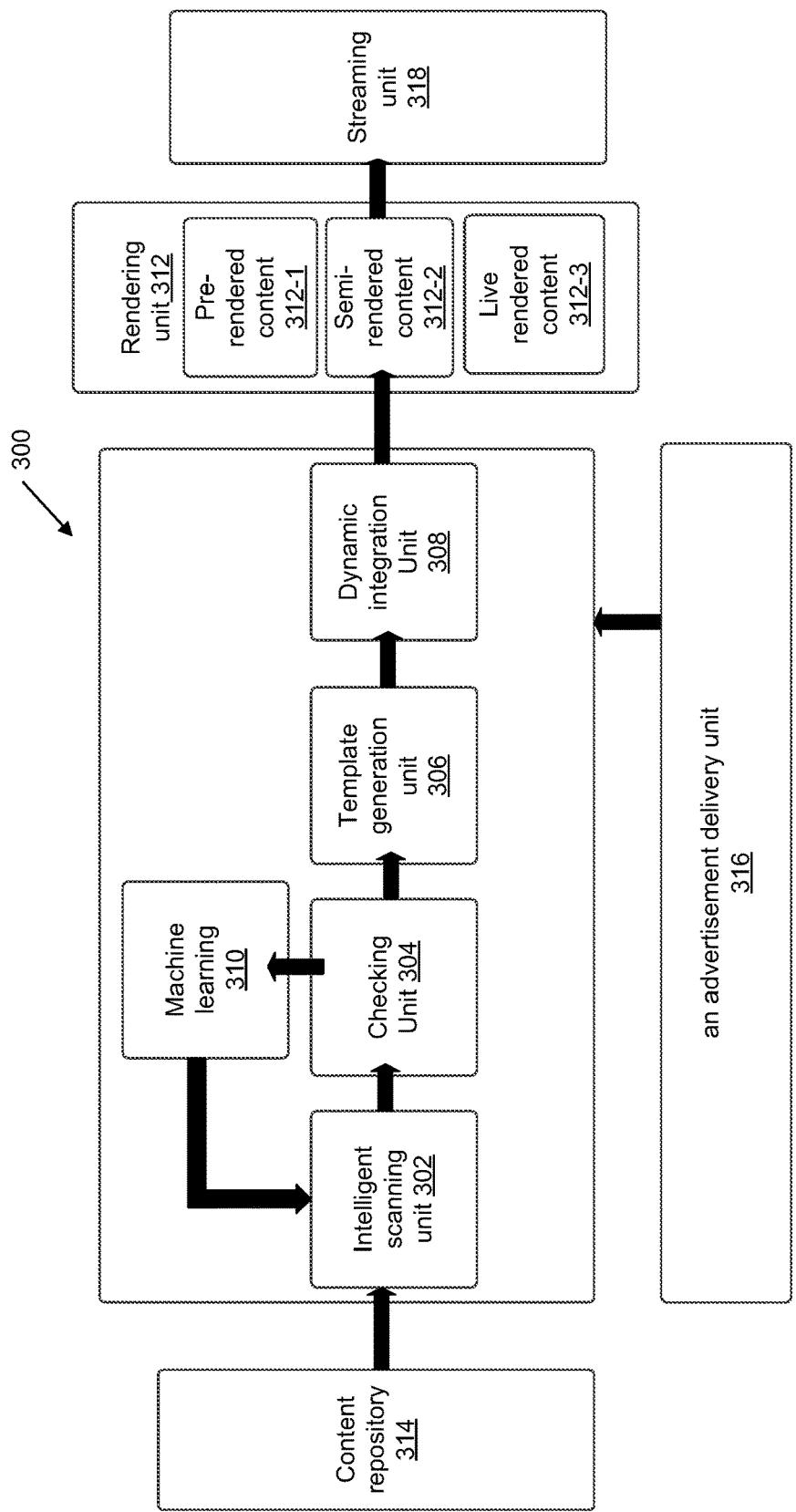
FIG. 3 illustrates another block diagram of the system, according to an example embodiment of the present disclosure.

FIG. 3 illustrates another block diagram for placing content in media, according to an example embodiment of the present disclosure. The block diagram illustrating a system 300 implements the functionality of the system 100. The components of the system 100 have already been explained in detail in the description of FIG. 1 and FIG. 2. Therefore, for the sake of brevity, these components are not explained in detail in with respect to the description of FIG. 3 FIG. 3 is provided to provide a better understanding and clarity of the present disclosure, and therefore, should not be construed as limiting.

The system 300 may include an intelligent scanning unit 302, a checking unit 304, a template generation unit 306, a dynamic integration unit 308, a machine learning unit 310, and a rendering unit 312. The machine learning unit 310 may be in communication with the intelligent scanning unit 302 and the checking unit 304.

Further, the system 300 may be in communication with a media repository 314, an advertisement delivery unit 316, and a streaming unit 318.

The system 300 may receive the media from the media repository 314, which may either be internal to system 300 or external to system 300. In particular, the intelligent scanning unit 302 of the system 300 may receive the media from the media repository 314. The intelligent scanning unit 302 may implement the functionalities of the receiving unit 102 and the scanner 104 of FIG. 1. The intelligent scanning unit 302 may determine the object in the media and determine the position of the placeholder to be placed in the object.

Further, the checking unit 304 may provide the placeholder positioned in the media to the user for feedback. In response, the checking unit 304 may receive the feedback of the user. The checking unit 304 may perform the functionality of the checker 106 of FIG. 1. The machine learning unit 310 may store the feedback of the user and may forward the stored feedback to the intelligent scanning unit 302. The machine learning unit 310 may implement the functionality of the machine learner 114 of FIG. 1.

In one example unit, the template generation unit 306 may generate a template indicating the placeholder in the media. The template generation unit 306 may implement the functionality of the template generator 110 of FIG. 1. Furthermore, the dynamic integration unit 308 may insert the advertisement in the placeholder of the media indicated in the template. In one embodiment, the dynamic integration unit 308 may receive the advertisement from the advertisement delivery unit 316. The dynamic integration unit 308 may implement the functionality of the dynamic integrator 112 of FIG. 1.

Following the integration, the media may be rendered through a rendering unit 312. The rendering unit 312 may implement the functionality of the rendering unit 116 of FIG. 1. As illustrated, the rendering unit 312 may include pre-rendered media 312-1, semi-rendered media 312-2, and live rendered media 312-3. After rendering, the streaming unit 318 may stream and deliver the rendered media to the viewers.

Figure 4:
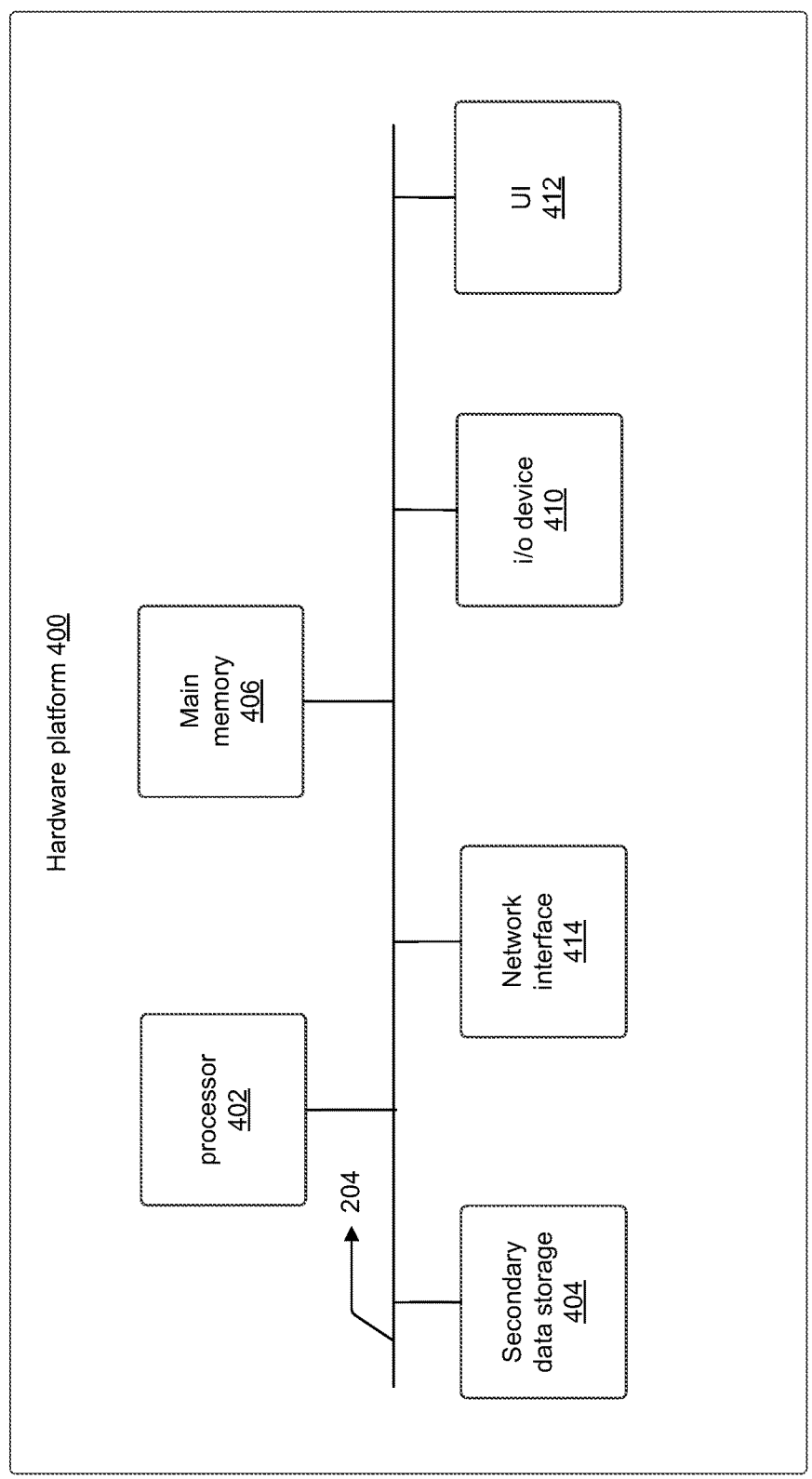
FIG. 4 illustrates a hardware platform for implementation of the system, according to an example of the present disclosure.

FIG. 4 illustrates a hardware platform 400 for implementation of the system 100, according to an example of the present disclosure. In an example embodiment, the hardware platform 400 may be a computer system 400 that may be used with the examples described herein. The computer system 400 may represent a computational platform that includes components that may be in a server or another computer system. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions, techniques and/or other processes described herein. Commands and data from the processor 402 may be communicated over a communication bus 404. The computer system 400 may also include a main memory 406, such as a random access memory (RAM), where the machine readable instructions and data for the processor 402 may reside during runtime, and a secondary data storage 408, which may be non-volatile and stores machine readable instructions and data. The memory 406 and data storage 408 are examples of non-transitory computer readable mediums. The memory 406 and/or the secondary data storage may store data used by the system 100, such as an object repository including web objects, configuration data, test data, etc.

The computer system 400 may include an Input/Output (I/O) device 410, such as a keyboard, a mouse, a display, etc. A user interface (UI) 412 can be a communication device that provides textual and graphical user interfaces to a user of the system 100. The UI 412 may operate with I/O device 410 to accept from and provide data to a user. The computer system 400 may include a network interface 414 for connecting to a network. Other known electronic components may be added or substituted in the computer system. The processor 402 may be designated as a hardware processor. The processor 402 may execute various components of the system 100 described above and perform the methods described below.

Figure 5:
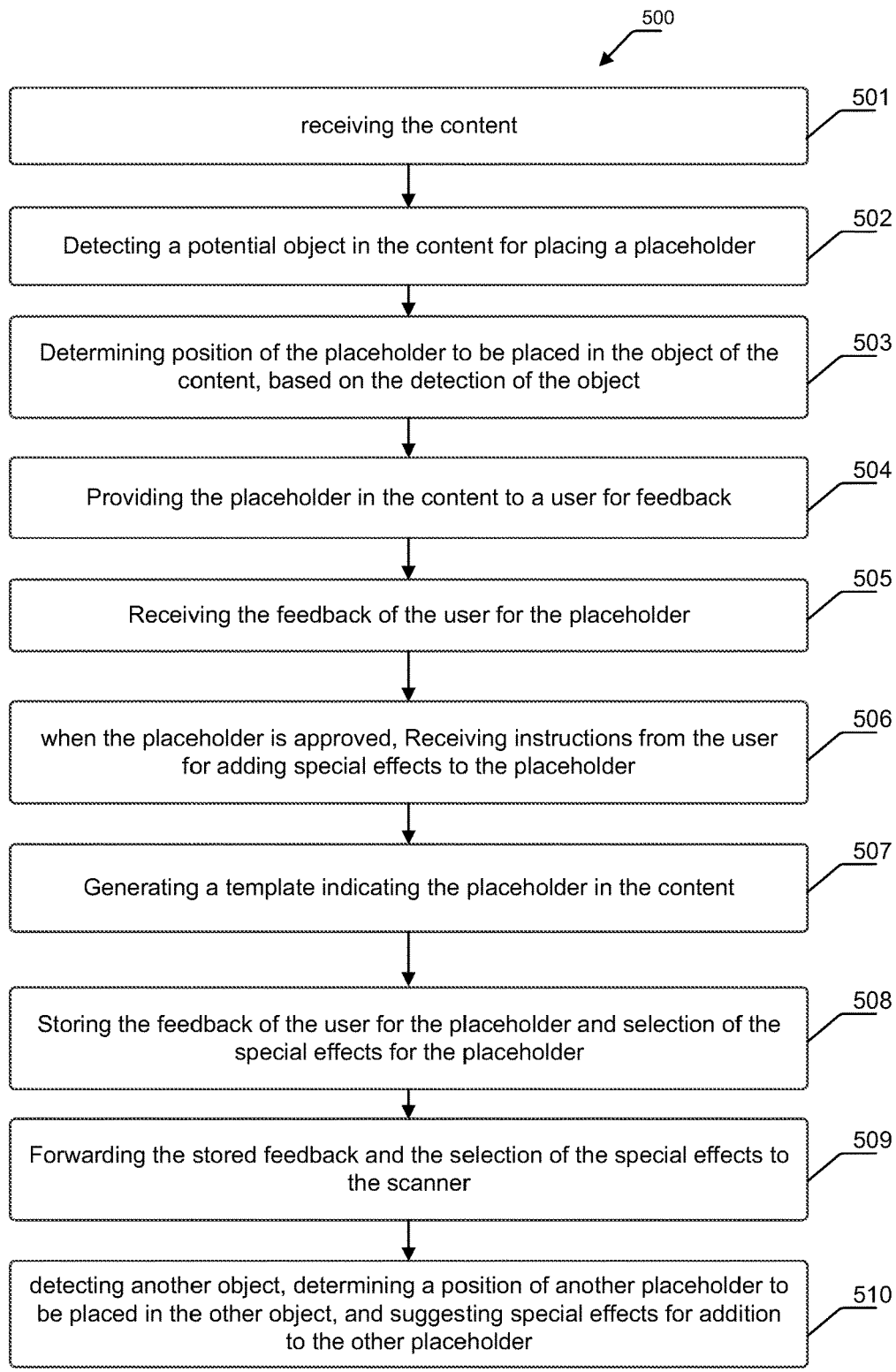
FIG. 5 illustrates a computer-implemented method depicting functionality of the system, according to an example embodiment of the present disclosure.

FIG. 5 illustrates a computer-implemented method 500 depicting functionality of the system 100, according to an example of the present disclosure. For the sake of brevity, construction and operational features of the system 100 which are explained in detail in the description of FIG. 1, FIG. 2, FIG. 3, and FIG. 4 are not explained in detail in the description of FIG. 5.

At 501, the method 500 commences with receiving the media. The media may include, but is not limited to, a still image and a video.

At 502, a potential object in the media may be detected for placing a placeholder. The detecting may include detecting a shape of the object. The shape may be detected by a semantic segmentation technique. The detecting may further include detecting edges of the object in the media, and recognizing a three-dimensional orientation of the object. The object may be at a location where other media is displayed in the media, e.g., a poster, a banner, a television screen, or a billboard.

At 503, a position of the placeholder to be placed in the object of the media may be determined, based on the detection of the object. In an example embodiment, the method 500 may include tracking, when the media is the video, the placeholder in different frames of the video, based on comparison of coordinates of the placeholder in the different frames.

At 504, the placeholder being positioned in the media may be provided to a user for feedback. At 505, the feedback of the user for the placeholder may be received. The feedback is indicative of one of an approval, a rejection, and a pending status of the placeholder.

At 506, when the placeholder is approved, instructions from the user for adding special effects to the placeholder may be received. The special effects may include, but is not limited to, a color adjustment, a contrast adjustment, a brightness adjustment, a saturation adjustment, and a blur adjustment.

At 507, a template may be generated which may be indicating the placeholder in the media. The template may include, but is not limited to, details pertaining to the media, details pertaining to the approved placeholder, and details pertaining to the special effects of the approved placeholder. In an example embodiment, the method 500 may include receiving an content to be inserted in the placeholder of the media from an content network. The content may be an advertisement and the content network may be an advertising network. Further, the content may be inserted in the placeholder of the media indicated in the template. Dimensions of the content may correspond to dimensions of the placeholder. The content may be a vectorized image and resized to suit the dimensions of the placeholder.

At 508, the feedback of the user for the placeholder and selection of the special effects for the placeholder may be stored. At 509, the stored feedback and the selection of the special effects may be forwarded to the scanner.

At 510, the method 500 may include detecting another object, determining a position of another placeholder to be placed in the other object, and suggesting special effects for addition to the other placeholder, based on the stored feedback and the selection of the special effects.

Figure 6:
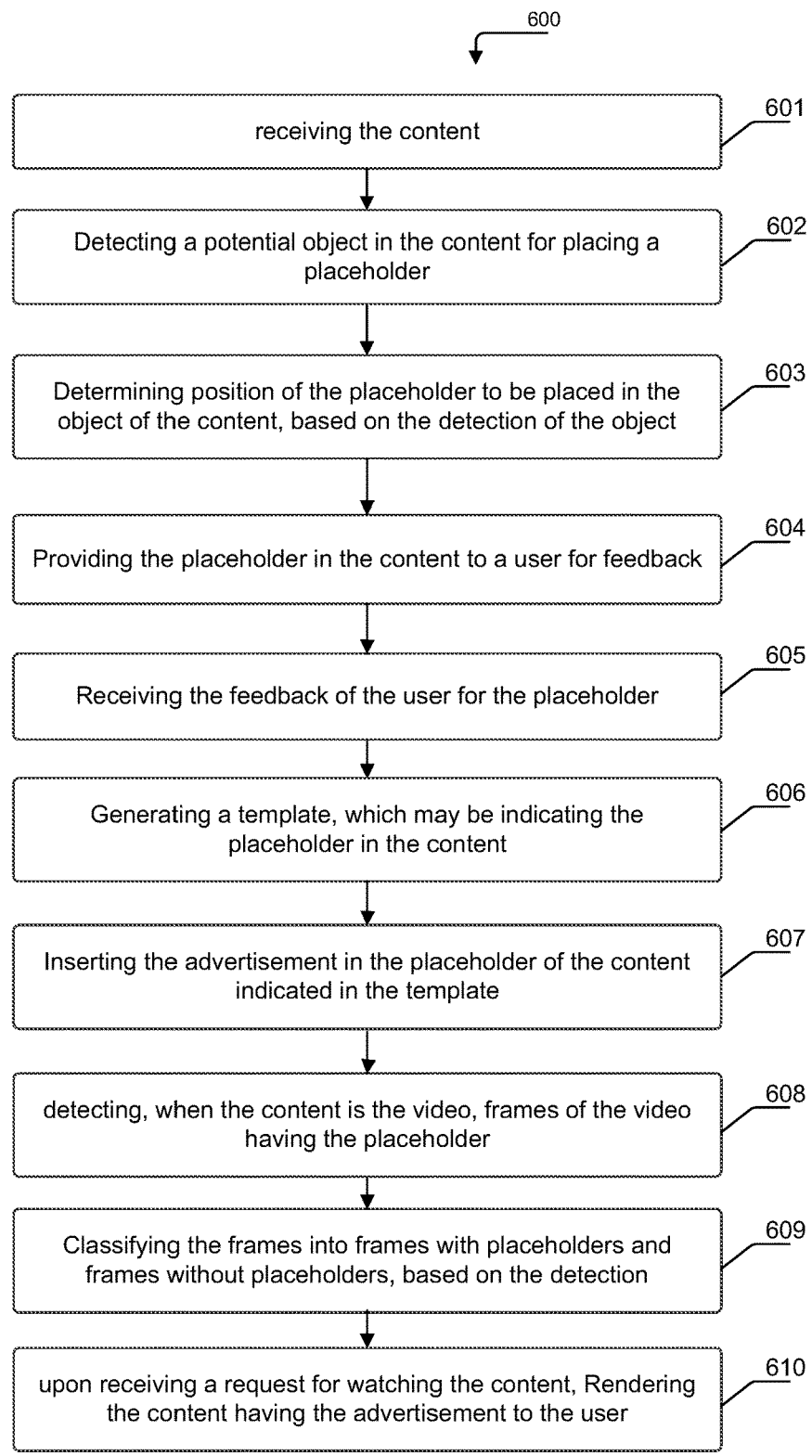
FIG. 6 illustrates a computer-implemented method depicting functionality of the system, according to another example embodiment of the present disclosure.

FIG. 6 illustrates a computer-implemented method 600 depicting the functionality of the system 100, according to another example embodiment of the present disclosure. For the sake of brevity, construction and operational features of the system 100 which are explained in detail in the description of FIG. 1, FIG. 2, FIG. 3, FIG. 4, and FIG. 5 are not explained in detail in the description of FIG. 6.

At block 601, the method 600 commences with receiving the media. The media may include, but is not limited to, a still image and a video.

At block 602, a potential object in the media for placing a placeholder may be detected. The object may be detected, based on at least one of the semantic segmentation technique and the edge detection technique.

At 603, a position of the placeholder to be placed in the object of the media may be determined, based on the detection of the object.

At 604, the placeholder being positioned in the media may be provided to a user for feedback. At 605, the feedback of the user for the placeholder may be received. The feedback is indicative of one of an approval, a rejection, and a pending status of the placeholder.

At 606, a template may be generated which may be indicating the placeholder in the media. The template may include, but is not limited to, details pertaining to the media, details pertaining to the approved placeholder, and details pertaining to the special effects of the approved placeholder.

At 607, the content may be inserted in the placeholder of the media indicated in the template. The dimensions of the content may correspond to the dimensions of the placeholder. The content may also be a vectorized image and resized to suit the dimensions of the placeholder.

At 608, the method 600 may include detecting, when the media is the video, frames of the video having the placeholder. The detection may be performed, based on the details of the media and the approved placeholder indicated in the template. At 609, the frames may be classified into frames with placeholders and frames without placeholders, based on the detection.

At 610, upon receiving a request for watching the media, the media having the content inserted may be rendered to the user. The rendering may be performed based on at least one of a storage capacity and a processing power of the rendering system.

Figure 7:
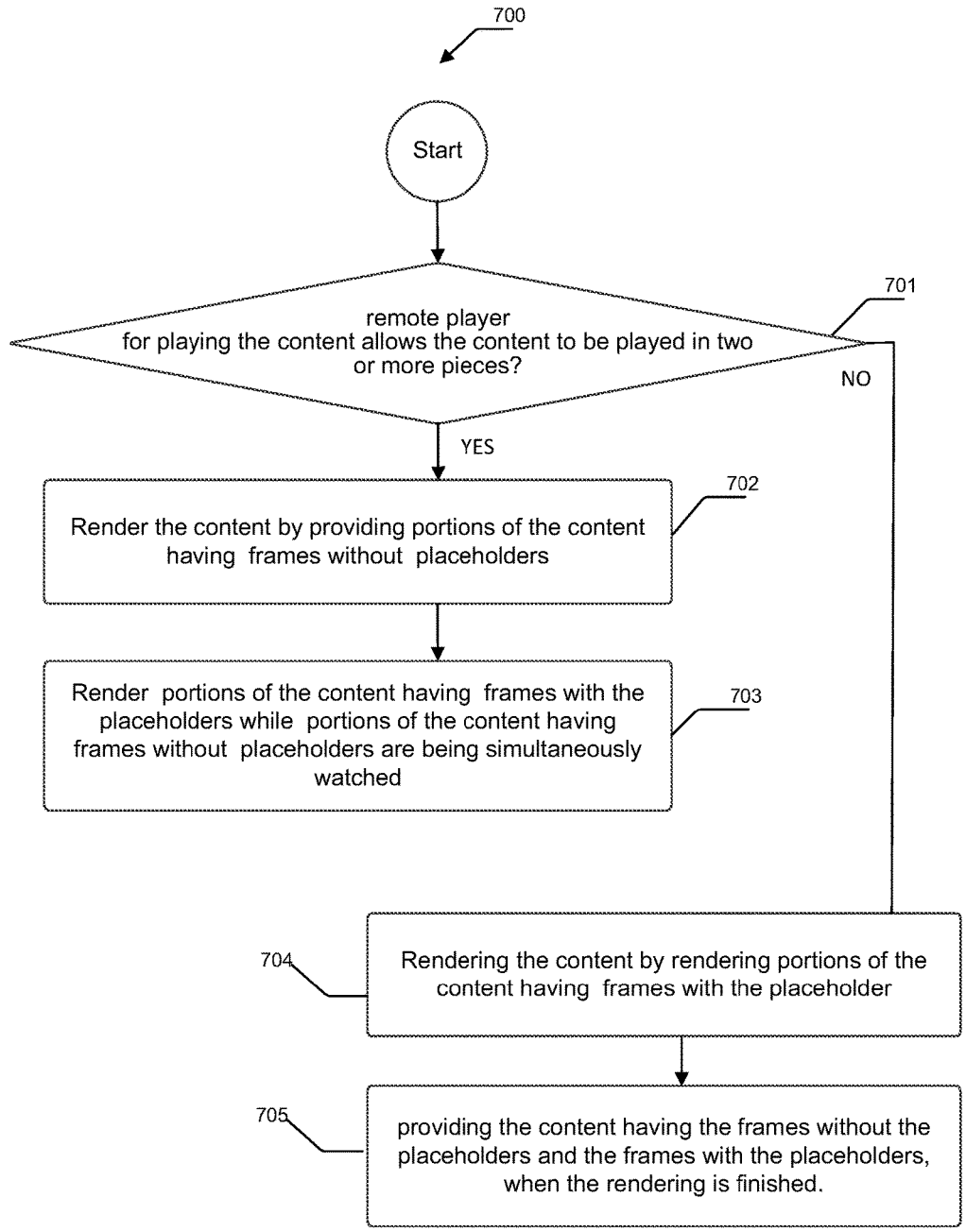
FIG. 7 illustrates a computer-implemented method depicting rendering of the content, according to another example embodiment of the present disclosure.

FIG. 7 illustrates a computer-implemented method 700 depicting rendering of the media, according to another example embodiment of the present disclosure. For the sake of brevity, construction and operational features of the system 100 which are explained in detail in the description of FIG. 1, FIG. 2, FIG. 3, FIG. 4, FIG. 5, and FIG. 6 are not explained in detail in the description of FIG. 7.

At 701, it is determined whether a remote player for playing the media allows the media to be played multiple segments. Each segment comprising one or more portions of the media, where each portion may include one or more frames. In an example embodiment, when it is determined that the remote player allows the media to be played in multiple segments, the method 700 branches to block 702. At 702, the media is rendered by providing portions of the media having the frames without the placeholders. Further, at 703, portions of the media having the frames with the placeholders are rendered while the portions of the media having the frames without the placeholders are being simultaneously played.

In an alternative example embodiment, when it is determined that the remote player allows the media to be played as a single segment only, the method 700 branches to block 704. At 704, the media is rendered by rendering portions of the media having the frames with the placeholders. Further, at 705, the media having the frames without the placeholders and the frames with the placeholders is provided, when the rendering is finished.

In an example embodiment, the method 700 may include detecting, when the media is video, a position of the placeholder in the media, based on the details pertaining to the placeholder indicated in the template. Further, portions of the media having the placeholder may be cut from the media, based on the detection. The portions having the placeholder may be cropped after cutting the portions from the media. Upon receiving a request for watching the media, the method 700 may include rendering the cropped portions of the media having the placeholder to the user, the rendered cropped portions to be played by the remote player.

In an example embodiment where the remote player for playing the media allows, the rendering may include providing portions of the media without the placeholder, and rendering the cropped portions of the media having the placeholder while the portions of the media without the placeholders are being simultaneously played, based on the details pertaining to the placeholder indicated in the template. In another example embodiment where the remote player allows the media to be played in one piece only, the rendering may include rendering portions of the media with the placeholders, and providing the media having the portions without the placeholder and the portions with the placeholder, when the rendering is finished.

In an alternative example embodiment, the method 700 may also include receiving information pertaining to specification of the remote machine 120 being used to watch the media. Further, it is determined whether the remote machine 120 is compatible to render the media, based on the specification of the remote machine 120. The method 700 may further include providing the media, the content, and the template to the remote machine 120. The content may then be integrated with each frame of the media, based on the template, while portions of the media without the placeholder are already being played by the remote machine 120.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system for rendering media having content displayed therein, the system comprising:
    a receiving unit to receive media, wherein the media includes one of an image and a video;
    a scanner in communication with the receiving unit to:
        detect a potential object in the media for placing a placeholder, based on at least one of a semantic segmentation technique and an edge detection technique wherein to detect the potential object, the scanner is to,
        detect a shape of the potential object, wherein the shape is detected by the semantic segmentation technique, and wherein to detect the shape, the scanner assigns a predefined label to each pixel of the media corresponding to the potential object and highlights a two-dimensional outline of the potential object;
        detect edges of the potential object in the media, by the edge detection technique; and recognize a three-dimensional orientation of the potential object; and determine a position of the placeholder to be placed in the potential object of the media, based on the detection of the object;

a checker, in communication with the scanner, the checker to:

provide the placeholder being positioned in the media to a user, for feedback; and receive the feedback of the user for the placeholder, wherein the feedback is indicative of one of an approval, a rejection, and a pending status of the placeholder;

a template generator in communication with the scanner and the checker to generate a template indicating the placeholder in the media, wherein the template includes at least one of details pertaining to the media and details pertaining to the approved placeholder; and a rendering unit in communication with the template generator to:

detect, when the media is the video, frames of the video having the placeholder, based on the details of the media and the approved placeholder indicated in the template;

classify the frames into frames with placeholders and frames without placeholders, based on the detection; and render, upon receiving a request for watching the media, the media having content to display to the user, based on at least one of a storage space and a processing capacity, wherein the rendering includes:

when a remote player for playing the media allows the media to be played in two or more pieces:

providing portions of the media having the frames without the placeholders, and rendering portions of the media having the frames with the placeholders while the portions of the media having the frames without the placeholders are being simultaneously watched; and when the remote player allows the media to be played in one piece:

rendering portions of the media having the frames with the placeholders, and providing the media having the frames without the placeholders and the frames with the placeholders, when the rendering is finished.

2. The system of claim 1, wherein the rendering unit to further, detect, when the media is the video, a position of the placeholder in the media, based on the details pertaining to the placeholder indicated in the template;

cut portions of the media having the placeholder, from the media, based on the detection;

crop the portions having the placeholder after cutting the portions from the media; and render, upon receiving a request for watching the media, the cropped portions of the media having the placeholder to the user, wherein the rendering includes:

when a remote player for playing the media allows the media to be played in two or more pieces:

providing portions of the media without the placeholder, and rendering the cropped portions of the media having the placeholder while the portions of the media without the placeholders are being simultaneously watched, based on the details pertaining to the placeholder indicated in the template; and when the remote player allows the media to be played in one piece:

rendering portions of the media with the placeholders, and providing the media having the portions without the placeholder and the portions with the placeholder, when the rendering is finished.

3. The system of claim 1, wherein the rendering unit is further to:

abort the rendering of a portion of the media having the frames with the placeholders, if the rendering is not finished till the time the remote player reaches the portion; and provide the portion of the media without the placeholders, after the abortion.

4. The system of claim 1, wherein the scanner is to further track, when the media is the video, the placeholder in different frames of the video, based on comparison of coordinates of the placeholder in the different frames.

5. The system of claim 1, wherein in order to provide the placeholder to the user for the feedback, the checker to:

highlight, for the user, at least one zone for placing the content on a frame of the media, in form of a semi-transparent rectangle.

6. The system of claim 1, wherein for providing the placeholder to the user for the feedback, the checker is to:

insert the content in at least one zone of a frame of the media.

7. The system of claim 1 further comprising a dynamic integrator in communication with the template generator, the dynamic integrator to insert the content in the placeholder of the media indicated in the template, wherein dimensions of the content correspond to dimensions of the placeholder.

8. The system of claim 7, wherein the content is an advertisement and the receiving unit is to further receive the advertisement to be inserted in the placeholder of the media from an advertisement network.

9. The system of claim 1, wherein the details pertaining to the media includes at least one of a name, a description, a location of the media on a storage server, and metadata.

10. The system of claim 1, wherein the details pertaining to the placeholder includes at least one of a position of the placeholder, dimensions of the placeholder, and a frame of the placeholder.

11. The system of claim 1 further comprising:

an instruction receiving unit in communication with the checker, the instruction receiving unit to receive, when the placeholder is approved, instructions from the user for adding special effects to the placeholder, wherein the special effects include at least one of a color correction, a contrast, a brightness, a saturation, and a blur;

a machine learner in communication with the scanner, the checker, and the instruction receiving unit, the machine learner to monitor, for predefined time intervals, the detection of the object, the determination of the position of the placeholder, the feedback of the user for the placeholder, and selection of the special effects for the placeholder; and the scanner in communication with the machine learner and the receiving unit, the scanner to further, detect another object in the media or at least another media;

determine a position of another placeholder to be placed in the other object; and suggest special effects for addition to the other placeholder, based on the monitoring.

12. The system of claim 11, wherein the instruction receiving unit is to:
  replace the placeholder with a neutral image on the media, wherein the neutral image is indicative of the content without the special effects; and
  change an appearance of the neutral image, based on selection of one of more of the special effects.

13. A system for rendering media having content displayed therein, the system comprising:
  a receiving unit to receive media, wherein the media includes one of an image and a video;
  an scanner in communication with the receiving unit, the scanner to:
    detect a potential object in the media for placing a placeholder, based on at least one of a semantic segmentation technique and an edge detection technique; wherein to detect the potential object, the scanner is to,
      detect a shape of the potential object, wherein the shape is detected by a semantic segmentation technique, and wherein to detect the shape, the scanner assigns a predefined label to each pixel of the media corresponding to the potential object and highlights a two-dimensional outline of the potential object;
      detect edges of the potential object in the media, by an edge detection technique; and
      recognize a three-dimensional orientation of the potential object; and
    determine a position of the placeholder to be placed in the object of the media, based on the detection of the object;
  a checker, in communication with the scanner, the checker to:
    provide the placeholder being positioned in the media to a user, for feedback; and
    receive the feedback of the user for the placeholder, wherein the feedback is indicative of one of an approval, a rejection, and a pending status of the placeholder;
  a template generator in communication with the scanner and the checker, the template generator to generate a template indicating the placeholder in the media, wherein the template includes at one of details pertaining to the media and details pertaining to the approved placeholder; and
  a rendering unit in communication with the template generator, the rendering unit to:
    receive information pertaining to specification of a remote machine being used to watch the media;
    determine whether the remote machine is compatible to render the media, based on the specification of the remote machine;
    provide the media, the content, and the template to the remote machine; and
    integrating the content with each frame of the media, based on the template, while portions of the media without the placeholder are already being played by the remote machine.

14. The system of claim 13, wherein the rendering unit is further to:
  abort the rendering of a portion of the media having the frames with the placeholders, if the rendering is not finished till the time the remote player reaches the portion; and
  provide the portion of the media without the placeholders, after the abortion.

15. The system of claim 13, wherein the scanner is to further track, when the media is the video, the placeholder in different frames of the video, based on comparison of coordinates of the placeholder in the different frames.

16. A non-transitory computer readable medium including machine readable instructions that are executable by a processor to:
  receive media, wherein the media includes one of an image and a video;
  detect a potential object in the media for placing a placeholder, based on at least one of a semantic segmentation technique and an edge detection technique; wherein detecting the potential object comprises,
    detecting a shape of the potential object, wherein the shape is detected by the semantic segmentation technique, and wherein to detecting the shape comprises assigning a predefined label to each pixel of the media and highlighting a two-dimensional outline of the potential object;
    detecting edges of the potential object in the media, by the edge detection technique; and
    recognizing a three-dimensional orientation of the potential object; and
  determine a position of the placeholder to be placed in the object of the media, based on the detection of the object;
  provide the placeholder being positioned in the media to a user, for feedback;
  receive the feedback of the user for the placeholder, wherein the feedback is indicative of one of an approval, a rejection, and a pending status of the placeholder;
  generate a template indicating the placeholder in the media, wherein the template includes at least one of details pertaining to the media and details pertaining to the approved placeholder;
  insert content in the placeholder of the media indicated in the template, wherein dimensions of the content correspond to dimensions of the placeholder;
  detect, when the media is the video, frames of the video having the placeholder, based on the details of the media and the approved placeholder indicated in the template;
  classify the frames into frames with placeholders and frames without placeholders, based on the detection; and
  render, upon receiving a request for watching the media, the media having the content displayed therein, based on at least one of a storage capacity and a processing power, wherein the rendering includes:
    in response to determining that a remote player for playing the media allows the media to be played in two or more pieces,
      providing portions of the media having the frames without the placeholders, and
      rendering portions of the media having the frames with the placeholders while the portions of the media having the frames without the placeholders are being simultaneously watched; and
    in response to determining that the remote player allows the media to be played in one piece,
      rendering portions of the media having the frames with the placeholders, and
      in response to determining that the rendering is finished, providing the media having the frames without the placeholders and the frames with the placeholders.

17. The non-transitory computer readable medium of claim 16, wherein the processor further includes machine executable instructions to:

detect, when the media is the video, a position of the placeholder in the media, based on the details pertaining to the placeholder indicated in the template;

cut portions of the media having the placeholder, from the media, based on the detection;

crop the portions having the placeholder after cutting the portions from the media; and render, upon receiving a request for watching the media, the cropped portions of the media having the placeholder to the user, wherein the rendering includes:

in response to determining that the remote player for playing the media allows portions of the media without the placeholder, providing the portions of the media without the placeholder, and rendering the cropped portions of the media having the placeholder while the portions of the media without the placeholders are being simultaneously watched, based on the details pertaining to the placeholder indicated in the template; and when the remote player allows the media to be played in one piece, rendering portions of the media with the placeholders, and in response to determining that the rendering is finished, providing the media having the portions without the placeholder and the portions with the placeholder.

18. The non-transitory computer readable medium of claim 16, wherein the processor further includes machine executable instructions to:

receive information pertaining to specification of a remote machine being used to watch the media;

determine whether the remote machine is compatible to render the media, based on the specification of the remote machine;

provide the media, the content, and the template to the remote machine; and integrate the content with each frame of the media, based on the template, while portions of the media without the placeholder are already being played by the remote machine.

* * * * *

UNITED STATES PATENT AND TRADEMARK OFFICE
CERTIFICATE OF CORRECTION

PATENT NO. : 10,237,585 B2
APPLICATION NO. : 15/934697
DATED : March 19, 2019
INVENTOR(S) : Christian Souche et al.

Page 1 of 1

It is certified that error appears in the above-identified patent and that said Letters Patent is hereby corrected as shown below:

On the Title Page

At Item (30), Foreign Application Priority Data "17168066" should be "17168066.3".

Signed and Sealed this
Twenty-fifth Day of June, 2019

Andrei Iancu
*Director of the United States Patent and Trademark Office*